April 30, 1935. M. P. BROWNE 1,999,391
SLIDING SEAT MOUNTING FOR AUTOMOBILES AND THE LIKE
Filed March 4, 1932
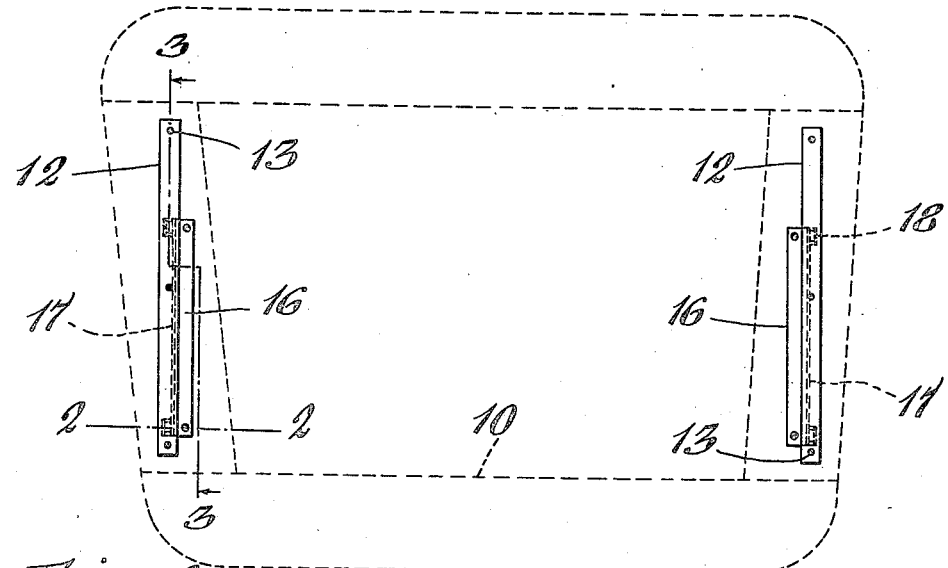
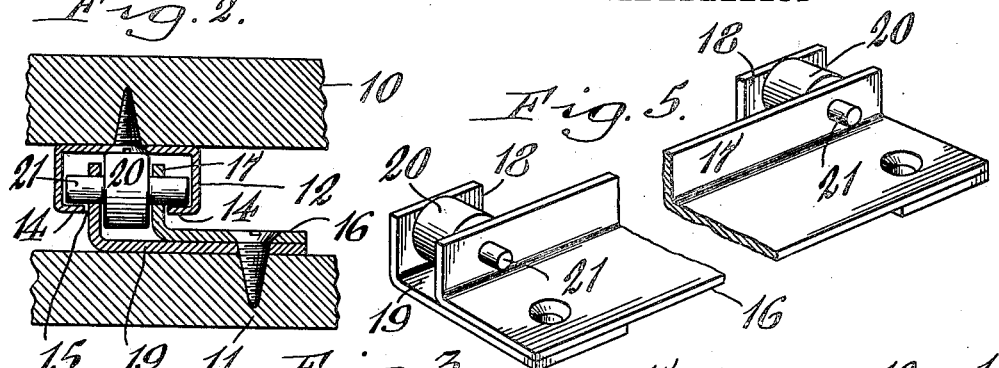
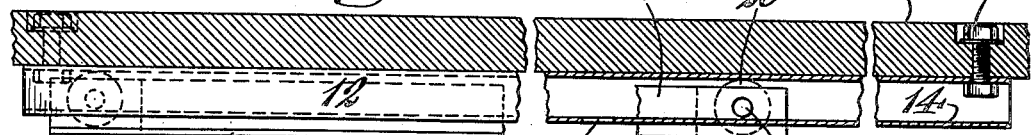
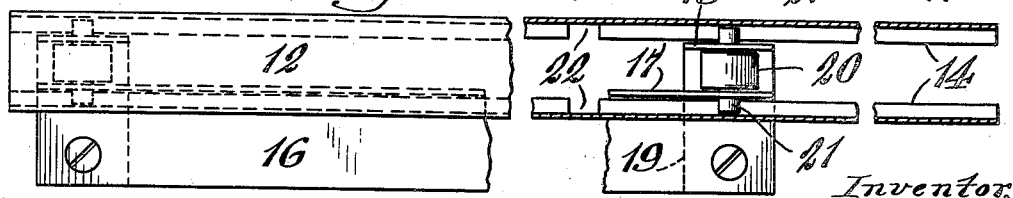
Inventor,
Montague P. Browne,
by Walter P. Geyer
Attorney.

Patented Apr. 30, 1935

1,999,391

UNITED STATES PATENT OFFICE 1,999,391

SLIDING SEAT MOUNTING FOR AUTOMOBILES AND THE LIKE

Montague P. Browne, Buffalo, N. Y., assignor to Mechanical Devices Corporation of America, Buffalo, N. Y., a corporation of New York Application March 4, 1932, Serial No. 596,788

5 Claims. (Cl. 155—14)

This invention relates generally to improvements in automobile seats but more particularly to a sliding mounting for such seats designed to afford comfort to the driver of the car and to facilitate the ingress and egress of passengers to and from the rear seat of the automobile.

It has for its object the provision of a seat mounting of this character which is simple, compact and inexpensive in construction, whose parts are designed to insure a smooth gliding action of the seat in a straight path against vertical and crosswise displacement, and which can be readily installed.

In the accompanying drawing:—

Figure 1 is a top plan view of the improved seat mounting, the vehicle seat being shown in outline by dotted lines. Figure 2 is an enlarged fragmentary transverse section thereof taken on line 2—2, Figure 1. Figure 3 is an enlarged fragmentary longitudinal section taken substantially in the plane of line 3—3, Figure 1. Figure 4 is an enlarged fragmentary top plan view of the seat mounting, partly in section. Figure 5 is a fragmentary perspective view of the floor plate and guide rollers carried thereby.

Similar characters of reference indicate corresponding parts throughout the several views.

By way of example, the invention is shown in connection with an automobile seat, the base frame 10 of which is shown by dotted lines in Figure 1, and by full lines in Figures 2 and 3. Applied to the floor 11 and to the under side of the seat-frame are complementary seat guiding means which serve to support the seat at its opposite sides and guide it longitudinally when shifting the same to a desired adjusted position, or to a position to facilitate the ingress and egress of passengers to and from the rear seat of the automobile, say, of the coach type. It is to be understood that any suitable holding means may be employed for latching the seat in a set position, but as such means do not form any part of the present invention it has not been deemed necessary to show them.

In the preferred construction of the seat guiding means, the same consists of a pair of guide members 12, 12 in the form of longitudinal channel bars or rails adapted for attachment to the underside of the seat frame 10 adjacent its opposite sides and secured thereto by bolts or screws 13. These guide rails are applied to the seat-frame with their channels facing downwardly and the depending side walls of each rail are provided with inwardly bent flanges 14 which are co-extensive with the length of the rail and which terminate at their opposing edges in spaced relation to provide a longitudinal passage 15 opening into the channel of the rail.

Mounted on the floor of the vehicle, below the guide rails 12 of the seat, is a base plate 16 provided along one of its edges with an upright longitudinal flange 17 and adjacent its ends with companion parallel flanges 18 which are spaced laterally from the flange 17. If desired, the flanges 18 may be formed on separate members 19 welded or otherwise secured to the ends of the base plate 16, as clearly shown in Figure 5. The flanges 17 and 18 are so spaced that they can be freely inserted through the longitudinal passage 15 of the guide rails 12 in relative guiding relation thereto, in the manner shown in Figure 2. Supported between the flanges 17, 18, are guide rollers 20 which are applied to horizontal pins 21 journaled in openings in said flanges, the upper faces of the rollers projecting above the corresponding edges of the flanges and the bases of the guide rails 12 resting on the peripheral faces of the rollers, whereby the seat is permitted a free sliding action over the rollers. The ends of the roller pins 21 project beyond their companion flanges 17, 18, as seen in Figure 2, and are adapted to occupy the spaces between the outer faces of said flanges and the inner faces of the depending walls of the guide rails 12, the flanges 14 of the latter extending around the lower sides of the pins to prevent vertical displacement of the seat relative thereto. The sidewise displacement of the seat is prevented by the relative disposition of the horizontal rail-flanges 14 and the upright floor-plate flanges 17 and 18, as well as by the extended ends of the roller pins 21 which are preferably arranged in contiguous relation to the depending walls of the guide rails 12 and constitute guide elements complementary to the latter.

To effect the ready application and removal of the seat with its guide rails 12 to and from the floor-plate 16, I preferably provide the rail-flanges 14 with inwardly-facing notches 22 through which the ends of the roller-pins 21 may be freely passed when the seat-frame is in a predetermined position to effect registration of said pins and notches.

The fastening bolts 13 of the guide rails 12 have their heads extending into the channels of the latter and thereby constitute stops or abutments against which the rollers are adapted to contact for limiting the fore and aft movements of the seat.

I claim as my invention:—

1. A sliding seat mounting for automobiles and the like, comprising a member adapted for attachment to the floor of the vehicle and having bearing rollers thereon and axial projections extending therefrom, and a second member adapted for attachment to the seat and in engagement with said rollers, said second member having portions complementary to said roller-projections for engagement therewith to prevent relative vertical displacement of said members.

2. A sliding seat mounting for automobiles and the like, comprising a member adapted for attachment to the floor of the vehicle and having bearing rollers thereon and axial projections extending therefrom, and a second member adapted for attachment to the seat and consisting of a channel rail fitted over said rollers in peripheral contact therewith and having flanges projecting inwardly from its side walls and engaging the undersides of said roller-projections.

3. A sliding seat mounting for automobiles and the like, comprising a member adapted for attachment to the floor of the vehicle and having spaced flanges rising therefrom and guide rollers journaled in said flanges, means adapted for attachment to the seat and consisting of a second member embracing said flanges and in contact with said guide rollers, said guide rollers having axial projections and said second member having portions engaging said projections to prevent relative vertical displacement of said members.

4. A sliding seat mounting for automobiles and the like, comprising a member adapted for attachment to the floor of the vehicle and having spaced flanges rising therefrom and guide rollers journaled in said flanges, said rollers having axial projections extending beyond said flanges, and a second member adapted for attachment to the seat and consisting of a channel rail embracing said flanges and having its base in contact with the guide rollers, the side walls of said rail terminating at their lower ends in opposing flanges overlying the undersides of said roller-projections.

5. A sliding seat mounting for automobiles and the like, comprising a member adapted for attachment to the floor of the vehicle and having spaced flanges rising therefrom and guide rollers journaled in said flanges, said rollers having axial projections extending beyond said flanges, and a second member adapted for attachment to the seat and consisting of a channel rail embracing said flanges and having its base in contact with the guide rollers, the side walls of said rail terminating at their lower ends in opposing flanges overlying the undersides of said roller-projections, said rail-flanges having notches therein adapted to register with said roller-projections in a predetermined position of said members.

MONTAGUE P. BROWNE.